(12) United States Patent
Pütter et al.

(10) Patent No.: US 6,727,015 B1
(45) Date of Patent: Apr. 27, 2004

(54) FUEL CELL

(75) Inventors: Hermann Pütter, Neustadt (DE); Andreas Fischer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 104 days.

(21) Appl. No.: 09/686,810

(22) Filed: Oct. 12, 2000

(30) Foreign Application Priority Data

Oct. 13, 1999 (DE) .......................... 199 49 347

(51) Int. Cl.[7] .......................... H01M 2/00; H01M 2/02; H01M 2/14; H01M 8/04
(52) U.S. Cl. .......................... 429/34; 429/38; 429/39; 429/14
(58) Field of Search .......................... 429/34, 38, 39, 429/12, 13, 14

(56) References Cited

U.S. PATENT DOCUMENTS

| 3,424,620 A | 1/1969 | Hughes et al. |
| 3,644,148 A | * 2/1972 | Guthier .......................... 429/13 |
| 4,218,518 A | 8/1980 | Vaseen |
| 5,480,515 A | 1/1996 | Gallien |
| 5,650,058 A | 7/1997 | Wenske et al. |

FOREIGN PATENT DOCUMENTS

| DE | 41 19 836 | 6/1991 |
| DE | 199 15 681.6 | 10/2000 |
| DE | 41 20 679 | 6/2001 |
| GB | 1 101 603 | 1/1968 |
| GB | 1 216 147 | 12/1970 |

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, P.C.

(57) ABSTRACT

In a fuel cell which comprises at least the following elements:
   a) two electrodes which are each provided with at least one gas duct for a reaction gas,
   b) a liquid electrolyte,
the respective gas ducts of the electrodes each have at least one inlet and run perpendicular to the migration direction of the ions under load prescribed by the arrangement of the electrodes.

14 Claims, 4 Drawing Sheets

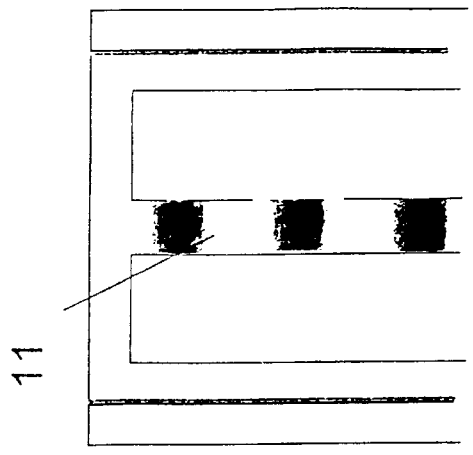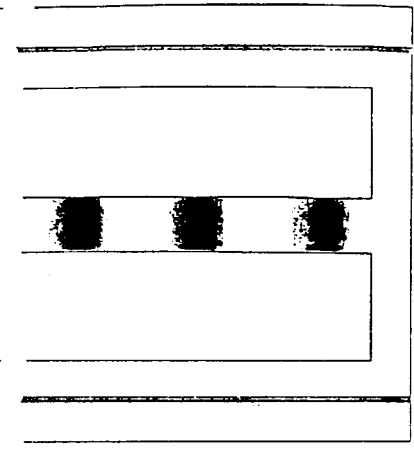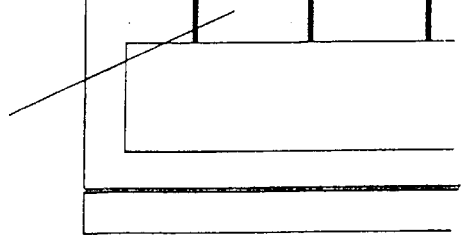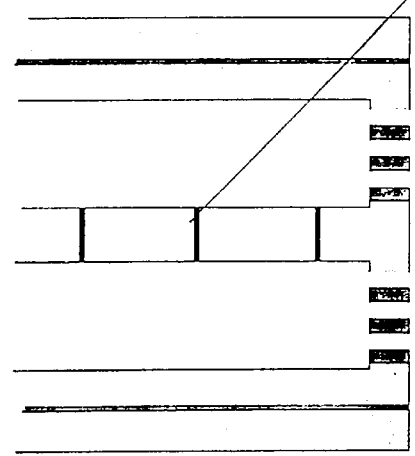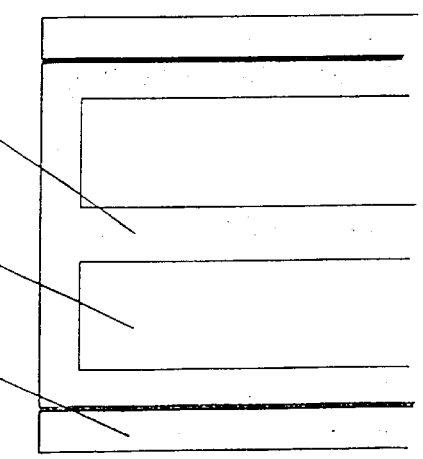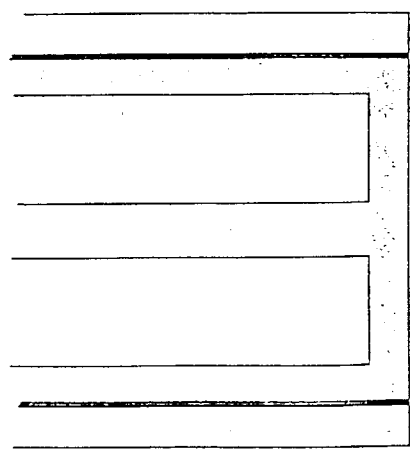
Fig. 4a  Fig. 4b  Fig. 4c

FUEL CELL

BACKGROUND OF THE INVENTION

The present invention relates to a fuel cell, in particular an undivided fuel cell with electrolyte-filled electrodes.

DISCUSSION OF THE BACKGROUND

Fuel cells are energy transformers which convert chemical energy into electrical energy. In a fuel cell, the principle of electrolysis is reversed.

Various types of fuel cells are known at the present time, and these differ from one another in, inter alia, the operating temperature. However, the structure of the cells is in principle the same in all types. They comprise, inter alia, two electrodes, namely an anode and a cathode, at which the reactions occur, and an electrolyte between the two electrodes. This has three functions. It establishes ionic contact, prevents electrical contact and also serves to separate the gases fed to the electrodes. The electrodes are generally supplied with gases which are reacted in a redox reaction. For example, the anode is supplied with hydrogen and the cathode is supplied with oxygen. To achieve this, the electrodes are provided with electrically conductive gas distribution devices. These are generally plates having a grid-like surface structure consisting of a system of fine channels. An exception is the direct methanol fuel cell in which the fuel is not gaseous but instead is an aqueous solution of methanol. The overall reaction in all fuel cells can be divided into an anodic substep and a cathodic substep. There are differences between the various types of cell in respect of the operating temperature, the electrolyte used and the possible fuel gases.

A fundamental distinction is made between low-temperature fuel cells and high-temperature systems. The low-temperature fuel cells generally have a very high electrical efficiency. However, the heat given off by them can be utilized only with difficulty because of the low temperature level. These fuel cells can therefore be utilized only for short-range heating and not for downstream energy transformation processes. Low-temperature fuel cells are therefore appropriate for mobile use and decentralized low-power applications. On the other hand, power generation stages can be installed downstream of the high-temperature systems in order to generate electric energy from the heat produced or to utilize the latter as process heat.

The present-day state of the art for fuel cells encompasses the following industrially relevant types:
AFC (alkaline fuel cells)
PEFC (polymer electrolyte fuel cell)
PAFC (phosphoric acid fuel cell)
MCFC (molten carbonate fuel cell)
SOFC (solid oxide fuel cell)

The polymer electrolyte fuel cell and the phosphoric acid fuel cell in particular are of great current interest both for stationary applications and for mobile uses and their broad commercialization is imminent. On the other hand, the other types are or were hitherto only operated in a few demonstration plants or for specific applications, e.g. in the space-flight sector or for military purposes.

According to the present-day state of the art, all fuel cells have gas-permeable, porous electrodes, known as three-dimensional electrodes. These electrodes are referred to by the collective term gas diffusion electrodes (GDE). Through these electrodes, the respective reaction gases are conveyed close to the electrodes (cf. FIG. 1). The electrolyte present in all fuel cells ensures ionic charge transport in the fuel cell. It has the additional task of forming a gastight barrier between the two electrodes. In addition, the electrolyte guarantees and aids formation of a stable three-phase layer in which the electrolytic reaction can take place.

In alkaline fuel cells, the electrolyte can be a liquid. In the phosphoric acid fuel cell and the molten carbonate fuel cell, on the other hand, inorganic, inert supports form, together with the electrolyte, an ion-conductive and gastight matrix. In the solid oxide fuel cell, a high-temperature oxygen ion conductor generally serves as electrolyte and simultaneously as membrane. The polymer electrolyte fuel cell uses organic ion exchange membranes, in the industrially implemented cases perfluorinated cation exchange membranes, as electrolytes.

The structure of the electrodes and the type of electrolyte determine the three-phase boundary layer. Conversely, the structure of the boundary phase for each of these types of cell leads to specific demands on the gas diffusion electrode and the electrolyte. This leads to restrictions in terms of current density, temperature conditions and usability of support materials and of catalysts and auxiliaries. The sealing of the separate gas spaces at the anode and cathode leads to complicated construction and thus also to high cost and technical difficulty.

In all present-day fuel cells, the reaction gases are supplied to the electrochemically active zone from the reverse side of the electrode, i.e. in each case the side facing away from the counterelectrode, by means of a gas distributor system. Under load, both gas transport and ion migration occur perpendicular to the given electrode geometry, with the ions migrating between the electrodes and the gases migrating to the electrodes on the reverse side. In overall terms, therefore, gas transport and ion transport proceed in parallel (cf. FIG. 1). This has the consequence that good gas transport to the boundary between the two electrodes would lead to mixing of the reaction gases at this boundary if this were not prevented by specifically provided separation media or, as in some AFCs, by defined flow of electrolyte over the electrodes. Mixing of the reaction gases has to be avoided for safety reasons. In addition, gas going over to the other electrode would lead to mixed potential formation at the respective electrode. This would result in a significant reduction in power. However, the difficulty of providing suitable transport and separation measures substantially restricts the cost-effectiveness and the efficiency of today's fuel cells. In addition, this working principle of present-day fuel cells makes the water balance and the heat management of the cell more difficult. In the case of a PEFC, for example, the water which forms has to be removed from the cell so that the gas diffusion electrodes do not "drown" while, on the other hand, the system has to be kept sufficiently moist to ensure that the membranes remain conductive. Furthermore, owing to the materials which withstand little thermal stress, in particular the ion exchange membrane, heat removal is likewise an important criterion for the long-term efficiency of the cells.

SUMMARY OF THE INVENTION

It is an object of the present invention to provide a fuel cell in which the disadvantages inherent in the above-described working principle of today's fuel cells are avoided.

We have found that this object is achieved by a fuel cell which comprises at least the following elements:

a) two electrodes which are each provided with at least one gas duct for a reaction gas, b) a liquid electrolyte, where the respective gas ducts of the electrodes have at least one inlet and run perpendicular to the migration direction of the ions under load prescribed by the arrangement of the electrodes.

For the purposes of the present invention, "perpendicular" means an angle between the gas duct and the migration direction of the ions which is in a range of 90°±45°, preferably 90°±20° and particularly preferably 90°±10°.

As a result of the reaction gases being conveyed perpendicular to the ions according to the present invention, mixing of the reaction gases at the boundary between the two electrodes is avoided without appropriate separation media or, as in the case of AFCs, appropriate flow of electrolyte over the electrodes, having to be provided. This considerably improves the economics and the efficiency of the fuel cells of the present invention compared to previously known fuel cells. Thus, there is no longer a need for a membrane to keep the reaction gases apart.

In a further preferred embodiment of the invention, the two electrodes are electrolyte-filled electrodes or electrodes which can be filled with electrolyte. The respective electrochemically active zones are thus not restricted to the respective surfaces of the two electrodes or corresponding regions between the two electrodes, but can occupy a considerably larger space, depending on the configuration of the gas ducts within the respective electrodes. The fuel cells of the present invention are thus significantly more economical than previous cells which have only very limited, in spatial terms, electrochemically active zones. Furthermore, the use of gas diffusion electrodes, i.e. of porous, gas-permeable bodies which bring about gas transport to the electrochemically active layer, are no longer necessary. The gas diffusion, electrodes uses hitherto are complex multicomponent sisters with a set hydrophilicity or hydrophobicity, porosity, catalyst loading or conductivity. They are very expensive and sometimes also chemically unstable. The omission of the membranes which has now become possible also reduces the costs considerably. In addition, the configuration according to the present invention also eliminates voltage losses which hitherto occurred both in the gas diffusion electrodes and in the indispensable membranes or other separation media. As a result, the energy yield and thus the total efficiency of the fuel cell of the present invention is increased compared to the prior art.

In a preferred embodiment of the invention, the fuel cell is thus an undivided cell since, when using the principle of the present invention, separation of the electrode spaces is no longer absolutely necessary and the reaction gases are no longer at risk of mixing with one another in an uncontrolled fashion. A divided cell is therefore no longer necessary for safety reasons.

In another embodiment of the invention, the fuel cell has a distributor system for introduction of in each case at least one reaction gas into the gas duct or ducts of the two electrodes. Preference is given here to using structures which are known in principle. Particular preference is given to using micromixers [V. Hessel, W. Ehrfeld, K. Golbig, V. Haverkamp, H. Löwe, T. Richter, *Proceedings of the 2nd International Conference on Microreaction Technology*, New Orleans, 1998]. The distributor system is, according to the present invention, designed so that a uniform, fine stream of gas bubbles rises in the electrodes. This increases the current density of the system. As reaction gases, preference is given to using oxygen and hydrogen. However, the use of methanol or methane is also conceivable here. In another preferred embodiment of the invention, the reaction gases are diluted with at least one suitable inert gas. Preference is given here to using nitrogen. The use of $CO_2$ as inert gas is also conceivable. The reaction gases, preferably diluted with at least one inert gas, are preferably fed from below via the distributor system of the present invention into the fuel cell chamber and supplied to the corresponding gas ducts within the respective electrodes so that they are conveyed perpendicular to the ions. This means, for example, that the reaction gases flow parallel to the gap between the two electrodes, i.e. the gap between anode and cathode.

In a preferred embodiment of the invention, the two or more electrodes can be filled with at least one electrolyte.

In the present invention, the electrolyte used is a liquid which conducts ions. Preference is given here to an aqueous alkali metal hydroxide solution or an aqueous mineral acid solution, for example sulfuric acid, phosphoric acid or a hydrohalic acid. In another preferred embodiment of the invention, an organic electrolyte is used. Preference is given here to tetraalkylammonium hydroxides or tetraalkylammonium salts, sulfonic acids or phosphonic acids. However, all other suitable electrolytes can also be used.

In a preferred embodiment of the invention, water is used as solvent. In another preferred embodiment, water-miscible solvents such as carboxylic acids, alcohols, carboxamides and/or substituted ureas are used. In a further preferred embodiment of the invention, liquid and/or molten salts, for example tetraalkylammonium salts, 1,3-dialkylimidazolium salts and/or tetrachloroaluminates, e.g. $NaAlCl_4$, are employed.

For the purposes of the present invention, the respective gas ducts of the electrodes can run either parallel or antiparallel, i.e. in countercurrent, to one another.

In a further preferred embodiment of the invention, the two electrodes are not arranged vertically, but have any angle of inclination and can even be arranged horizontally. The fuel cell can thus be configured in a manner appropriate to the demands made of it. It can be made very compact and thus space-saving.

The gap between the two or more electrodes preferably has a planar geometry. However, in another preferred embodiment of the invention, the gap can have a geometry other than planar, e.g. the two or more electrodes are arranged relative to one another so as to form an annular gap.

The electrodes have an inlet for the respective gas ducts and preferably also at least one corresponding outlet.

In a further, preferred embodiment of the invention, the width of the electrodes differs going from the inlet of the respective gas ducts to the outlet of the corresponding gas ducts. The inlet is preferably wider than the corresponding outlet, since a large amount of gas passes through the inlet while a smaller amount of gas passes through the outlet as a result of consumption. Thus, for example, the electrode/gap assembly forms a frustrum of a pyramid, a frustrum of a cone or has, for example, the cross section of a trapezoid. However, other geometric arrangements are also conceivable.

In a further, preferred embodiment of the invention, at least one of the two or more electrodes comprises a plurality of individual components. In one preferred embodiment of the invention, it comprises a plurality of parallel plates joined to form a lamellar structure. In the resulting intermediate spaces, the gas is conveyed parallel to the outer edges from one end face to the opposite end face. The distributor system supplies gas bubbles and takes up residual gases again. Within the circulated electrolyte system, the gas bubbles remain in the electrode.

Such electrodes are known from DE 41 20 679. There, these are referred to as capillary gap electrodes. In contrast to the present invention, however, the gas is supplied to the system from the reverse side of the electrode so that ion and gas transport occur in a parallel direction, as a result of which the disadvantages mentioned at the outset also occur when using these capillary gap electrodes. In addition, DE 41 19 836 expressly states that gas transport in the "surface region" is easier than in the interior of the respective electrode and not vice versa. For this reason, a divided fuel cell is also absolutely necessary here. A preferred embodiment of the present invention is distinguished from these cells in that the electrolyte space between two electrode lamellae is structured so that gas transport takes place perpendicular to ion transport.

In a preferred embodiment of the invention, the surface of the electrodes is structured so as to form channels which run in the same direction as the gas duct or ducts. The profile of the channels can be semicircular, rectangular, triangular or of any other shape. The channels are preferably formed in the solid electrode material by milling, etching and/or other techniques. In another preferred embodiment of the invention, the channels are generated by appropriate corrugation of metal sheets or meshes. In a further preferred embodiment of the invention, the channels are produced by electroplating techniques in which the desired metal and/or alloy is deposited on a substrate which is appropriately masked by means of a template. Furthermore, other structures such as slotted tubes, wire bundles or drilled porous metal bodies or a suitable combined arrangement of these structures are also conceivable.

A particular advantage of the fuel cell of the present invention is that it provides new degrees of freedom in terms of the electrocatalytically active electrode surface. Since the individual subelectrodes, i.e. the individual lamellae, can be treated in any way prior to assembly to form the overall electrode, they can be activated by means of catalysts in an appropriate manner. This is achieved by coating with electrocatalytically active materials, for example with noble metals such as platinum, palladium, silver, ruthenium or iridium or combinations of these. This can be carried out, in particular, by electrolytic coating or electroless deposition of metal. A particularly advantageous procedure is described, for example, in DE 199 15 681.6.

In a further, preferred embodiment of the invention, the fuel cell additionally has at least one spacer which is arranged in such a way that it interacts functionally with the electrodes. Within the fuel cell, the electrodes are combined with spacers, so that electrodes made up of a plurality of individual elements are used. The electrodes particularly preferably comprise plates arranged in parallel which are joined to form a lamellar structure. The individual electrically conductive lamellae are kept apart by spacers so that passage of gas within the electrodes is ensured. According to the present invention, such a spacer has at least the following constituents:

a) a spacing-determining frame,
b) a window,
c) a gas barrier.

The spacing-determining frame defines and ensures the spacing of the individual lamellae. The window ensures unhindered gas and electrolyte flow between the lamellae of an electrode. The gas barrier consists of a web between the windows of anode and cathode and prevents gas bubbles from passing into the region of the respective counterelectrode. The web can be configured in various ways. For example, it can have a corrugated or folded structure. In a particularly preferred embodiment of the invention, the web is provided with further spacing elements, by which means the functional structure of the entire electrode/spacer unit is additionally stabilized.

BRIEF DESCRIPTION OF THE DRAWINGS

Further advantages and possible uses are indicated by the description of the following embodiments of a fuel cell according to the present invention in conjunction with the figures. In the figures:

FIG. 4 schematically shows various possible configurations of a spacer of an embodiment of a fuel cell according to the present invention.

DISCUSSION OF THE PREFERRED EMBODIMENTS

Figure 1:
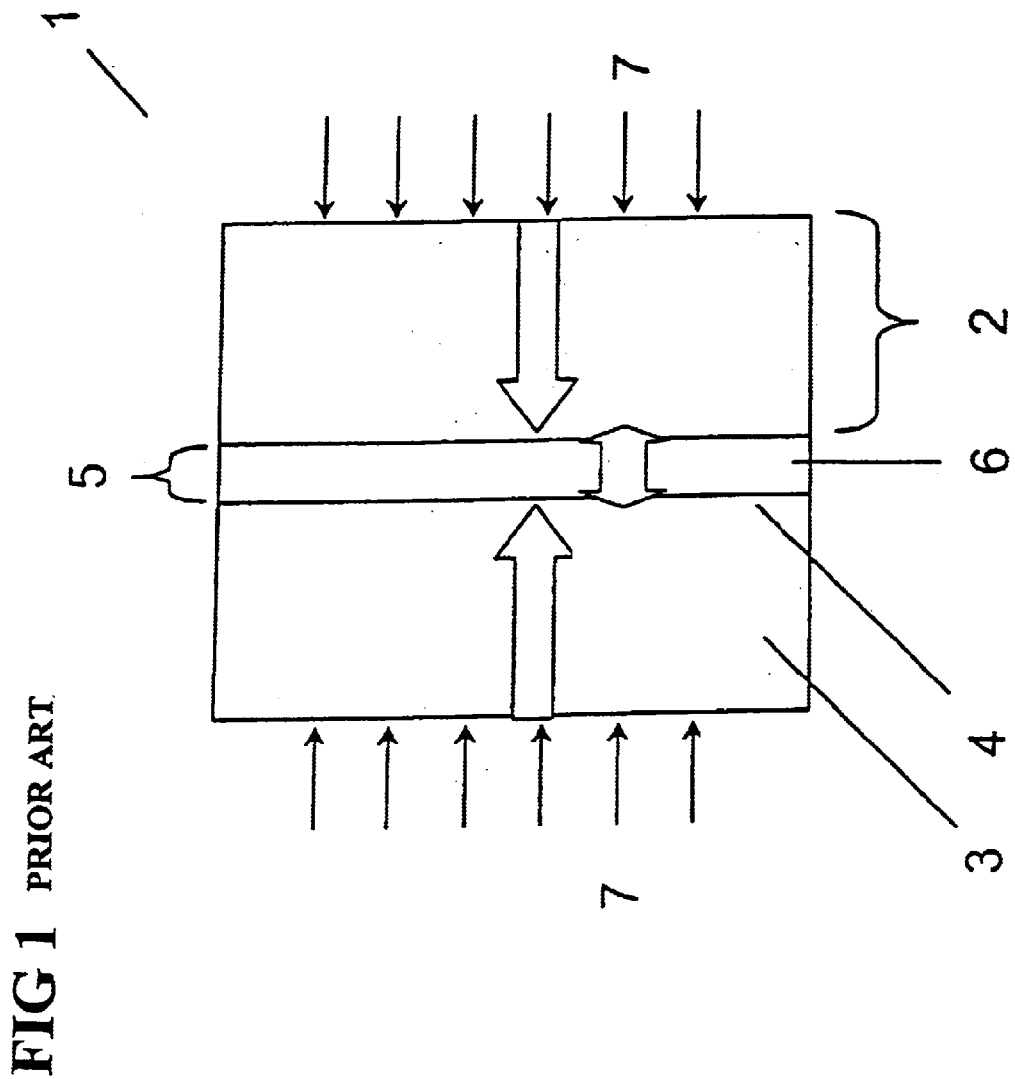
FIG. 1 schematically shows the structure of a fuel cell according to the prior art.

FIG. 1 schematically shows a fuel cell 1 according to the present-day state of the art. In general, such a fuel cell 1 comprises two gas-permeable, porous electrodes 2, which are known by the term gas diffusion electrodes (GDEs), located opposite one another. They comprise a porous, electrically conductive substrate 3 and an electrocatalytic layer 4. A membrane 6 is located within the gap 5 provided between the electrodes 2. This membrane 6 at the same time incorporates the electrolyte. The electrolyte ensures ionic charge transport in the fuel cell. It forms a gastight barrier between the two electrodes 2 and thus guarantees an electrochemically active zone within which the electrolysis can take place. The electrolyte can be a liquid. In a phosphoric acid fuel cell and in the molten carbonate fuel cell, inorganic, inert supports together with the electrolytes form a gastight matrix which conducts ions. In the case of the solid oxide fuel cell, a high-temperature oxygen ion conductor generally serves as membrane. The polymer electrolyte fuel cell uses organic ion exchange membranes, for example perfluorinated cation exchange membranes. Intimate contact between the membrane and the gas diffusion electrodes is achieved by complicated techniques, e.g. by hot pressing and further substeps. The reaction gases 7 are fed to the electrochemically active zone from the reverse side of the electrode 2, i.e. in each case the side facing away from the counterelectrode, via gas distributor systems. Thus, gas transport (wide arrows pointing in one direction) and ion transport (wide double-headed arrow) occur in parallel directions.

Figure 2:
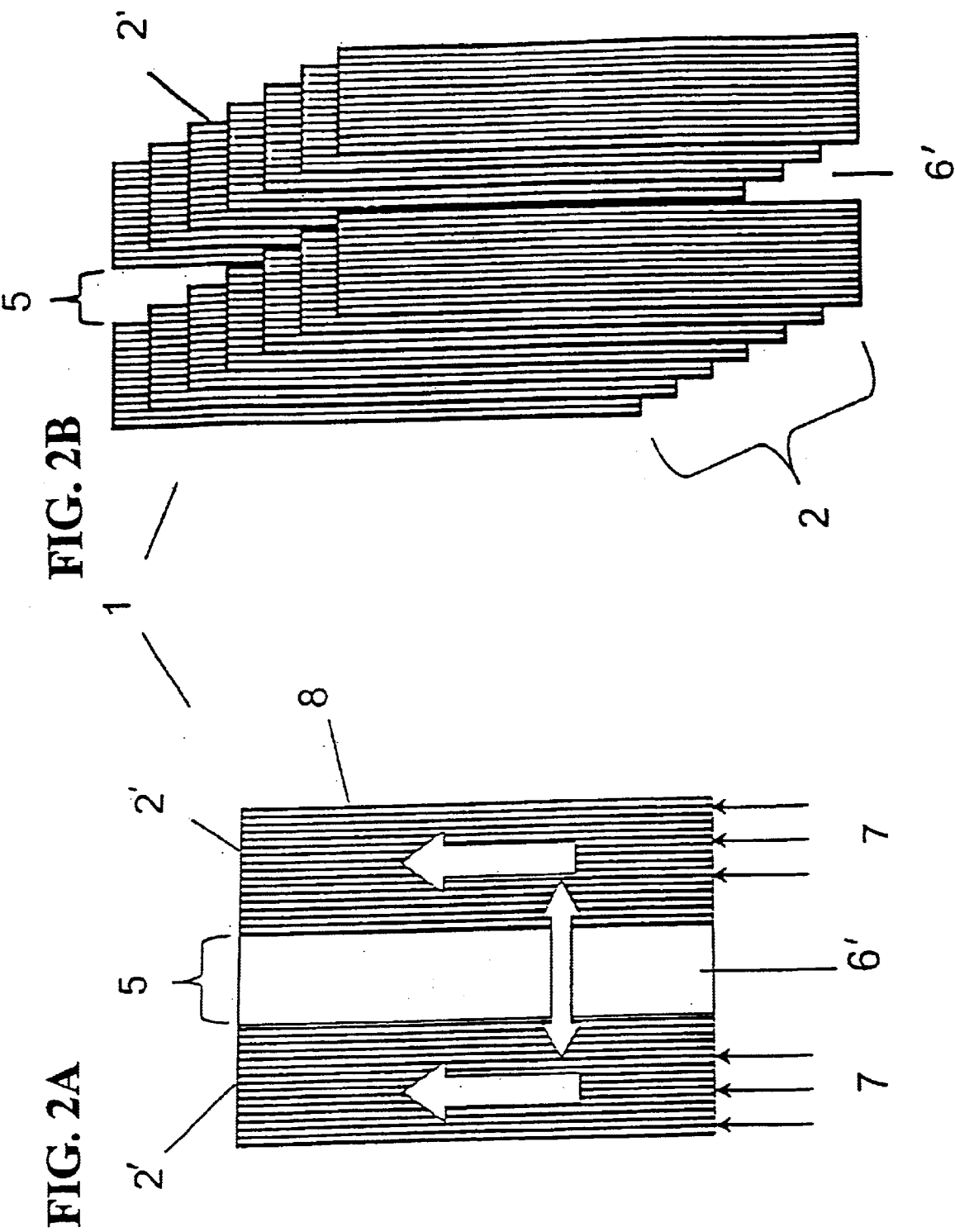
FIG. 2 schematically shows the structure of an embodiment of a fuel cell according to the present invention, front view (FIG. 2a) and obliquely from above (FIG. 2b)

FIG. 2a schematically shows a fuel cell 1 according to the present invention, showing two electrode segments 2' and the intervening gap 5. This is an undivided fuel cell, i.e. there is no membrane or other separation device present to separate the anode space from the cathode space. The electrode segments 2' are filled with an electrolyte 6' which is also present in the gap or the intermediate space 5 between the electrode segments 2'. The electrolyte 6' is a liquid which conducts ions, for example an aqueous alkali metal hydroxide solution or an aqueous mineral acid solution such as sulfuric acid, phosphoric acid or a hydrohalic acid. Organic electrolytes such as tetraalkylammonium hydroxides or tetraalkylammonium salts, sulfonic acids or phosphoric acids can likewise be used. Within the respective electrode segments 2', gas ducts 8 running parallel to the gap 5 between the electrode segments 2' are provided, so that gas transport occurs in a direction perpendicular to ion transport. This prevents uncontrolled mixing of the reaction gases. Each of the electrode segments 2' is provided with a gas supply 7 by means of which the respective reaction gases, preferably hydrogen or oxygen, preferably diluted with inert gases such as nitrogen, are fed in.

While FIG. 2a depicts a cross section of an embodiment of the fuel cell 1 of the present invention, FIG. 2b shows a view obliquely from above. It can be seen that an electrode 2 is composed of a plurality of electrode segments 2' of the same type and that two such electrodes 2 are in turn combined to form an overall system, i.e. the fuel cell 1. Here, for example, each second segment can be the mirror image of each adjacent segment. The electrode segments 2' can be provided with channels on both sides or only on one side. However, a channel structure can also be omitted on each second electrode segment if the shaping of the other electrode segments requires this or makes this possible.

Figure 3:
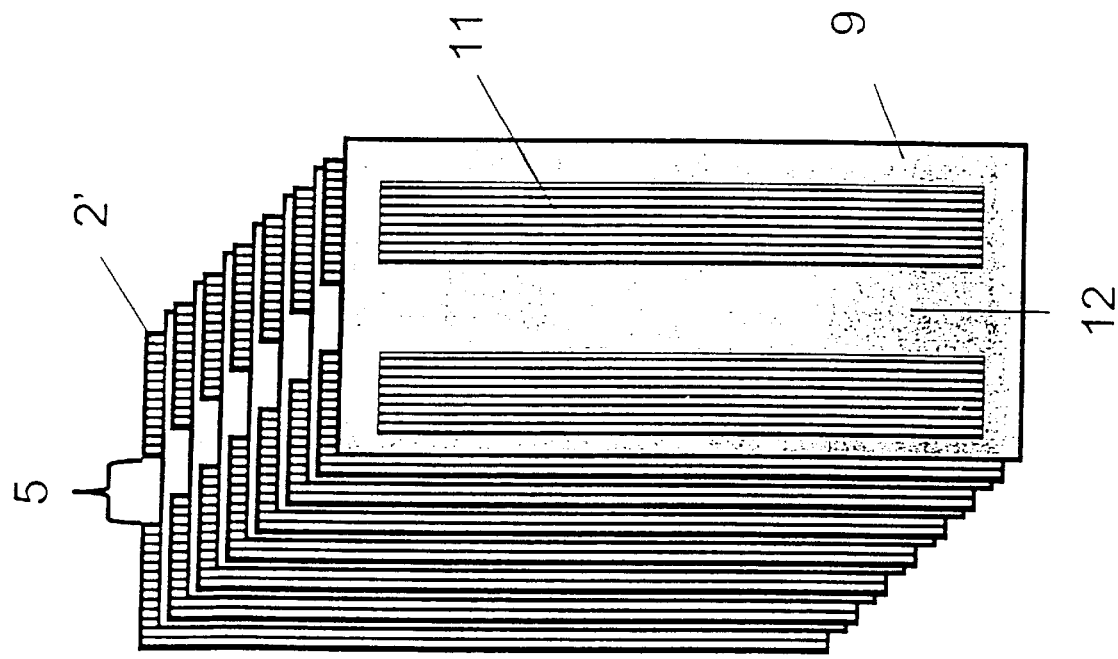
FIG. 3 schematically shows a further fuel cell according to the present invention.

FIG. 3 schematically shows a further embodiment of a fuel cell 1 according to the present invention, viewed obliquely from above. The electrodes 2 are composed of a plurality of individual components, namely the electrode segments 2'. The electrode segments 2' here comprise plates arranged in parallel and joined to form a lamellar structure. Spacers 9 keep the individual electrically conductive plates at a distance apart which ensures passage of gas.

FIG. 4 shows various possible configurations of the spacer 9 in preferred embodiments of the fuel cell 1 of the present invention. The spacer 9 comprises three types of functional components, namely a spacing-determining frame 10, a window 11 and a gas barrier 12. The spacing-determining frame 10 defines and ensures the spacing of the individual plates. The window 11 ensures unhindered gas and electrolyte flow between the plates of an electrode 2. The gas barrier 12 comprises a web between the windows 11 of anode and cathode and prevents gas bubbles from passing into the region of the respective counterelectrode. The web 12 can be planar (cf. FIG. 4a), or can be corrugated or folded (cf. FIG. 4c) or can be provided with spacing elements 13 (cf. FIG. 4b) so as to enable a plurality of webs to be fixed to one another. In the preferred embodiment, which is depicted in FIG. 4b, the gas feed facility 7 is integrated into the spacer 9.

We claim:

1. A fuel cell comprising:
    two electrodes each having therein a plurality of gas ducts for a reaction gas, said electrodes and said gas ducts being filled with a liquid electrolyte,
    wherein respective gas ducts of the electrodes each have at least one inlet and are arranged perpendicular to a migration direction of ions under a load prescribed by the electrodes.

2. A fuel cell as claimed in claim 1, wherein said fuel cell is an undivided cell.

3. A fuel cell as claimed in claim 1, wherein the respective gas ducts of the electrodes each have at least one outlet.

4. A fuel cell as claimed in claim 1, wherein the respective gas ducts of the two electrodes are configured antiparallel to one another.

5. A fuel cell as claimed in claim 1, wherein the respective gas ducts of the two electrodes are configured parallel to one another.

6. A fuel cell as claimed in claim 1, wherein at least one of the two electrodes has at least one channel which runs in a direction of the at least one gas duct.

7. A fuel cell as claimed in claim 1, further comprising:
    at least one spacer arranged to interact functionally with the electrodes.

8. A fuel cell comprising:
    two electrodes each having therein a plurality of gas ducts for a reaction gas, said electrodes and said gas ducts being filled with a liquid electrolyte,
    wherein respective gas ducts of the electrodes each have at least one inlet, are arranged perpendicular to a migration direction of ions under a load prescribed by the electrodes, and include a distributor system for introduction of at least one reaction gas into the gas duct or ducts of the two electrodes.

9. A fuel cell as claimed in claim 8, wherein the reaction gases include at least one inert gas.

10. A fuel cell as claimed in claim 8, wherein the respective gas ducts of the two electrodes are configured antiparallel to one another.

11. A fuel cell as claimed in claim 8, wherein the respective gas ducts of the two electrodes are configured parallel to one another.

12. A fuel cell as claimed in claim 8, wherein at least one of the two electrodes has at least one channel which runs in a direction of the at least one gas duct.

13. A fuel cell comprising:
    two electrodes each having therein a plurality of gas ducts for a reaction gas, said electrodes and said gas ducts being disposed in a liquid electrolyte,
    wherein respective gas ducts of the electrodes each have at least one inlet and are arranged perpendicular to a migration direction of ions under load prescribed by the electrodes, and at least one of the two electrodes comprises a plurality of parallel plates joined to form a lamellar structure.

14. A fuel cell as claimed in claim 13, wherein at least one of the two electrodes has at least one channel which runs in a direction of the at least one gas duct.

* * * * *